United States Patent Office 3,713,989
Patented Jan. 30, 1973

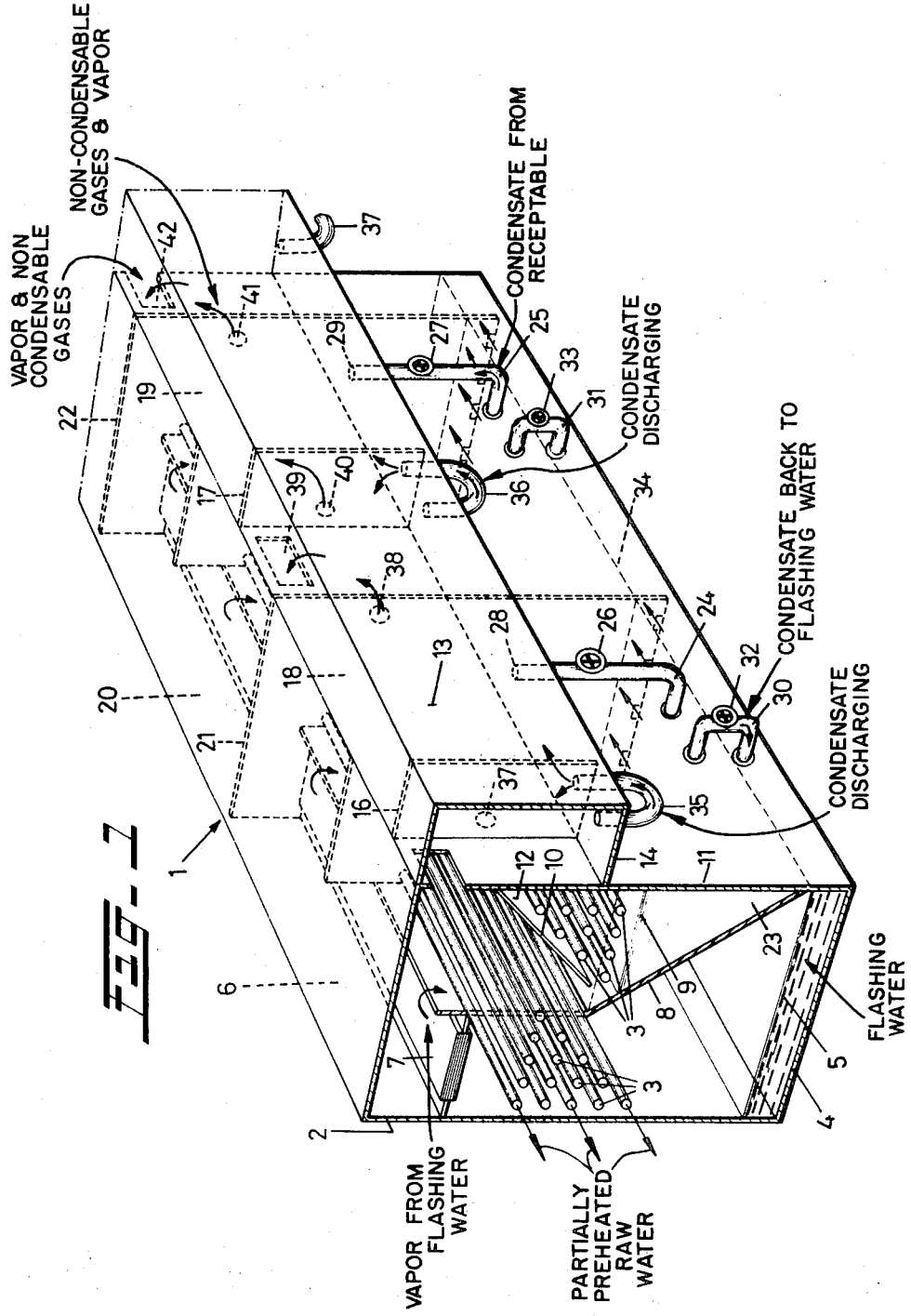

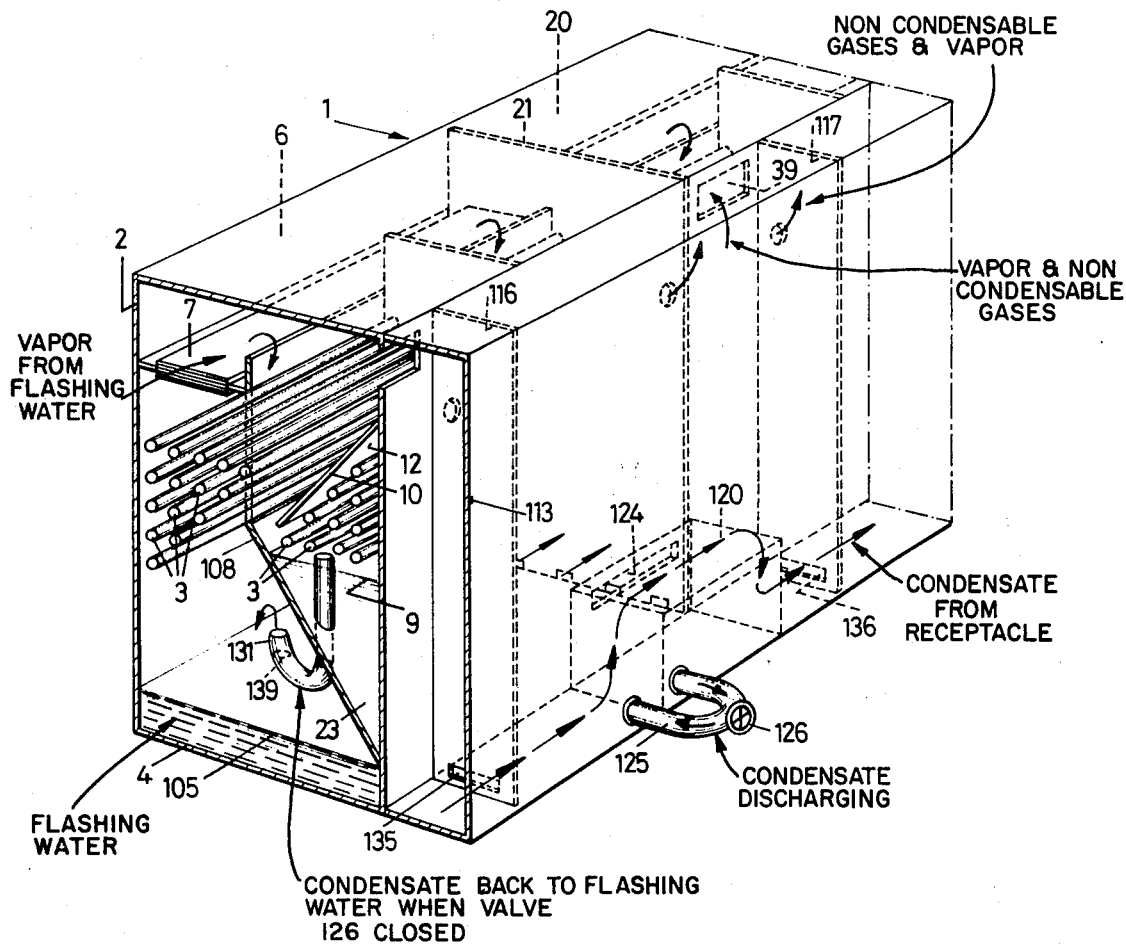

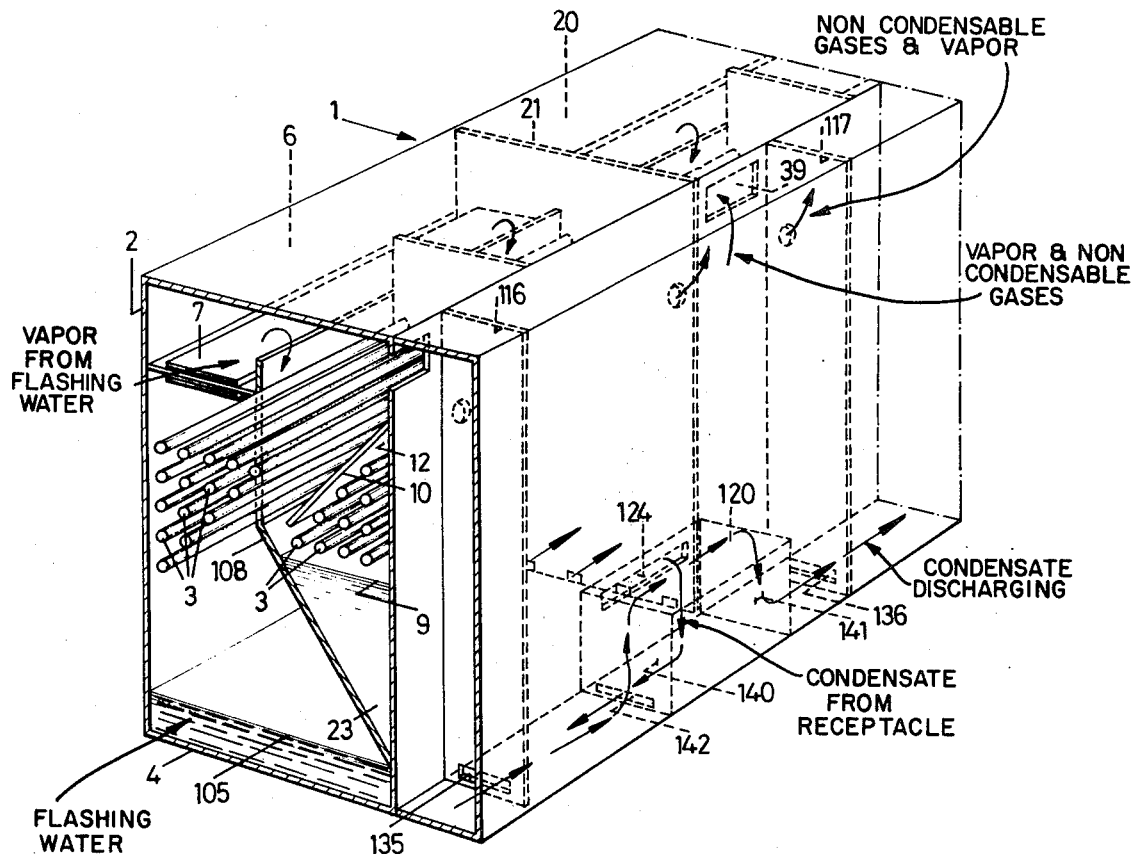

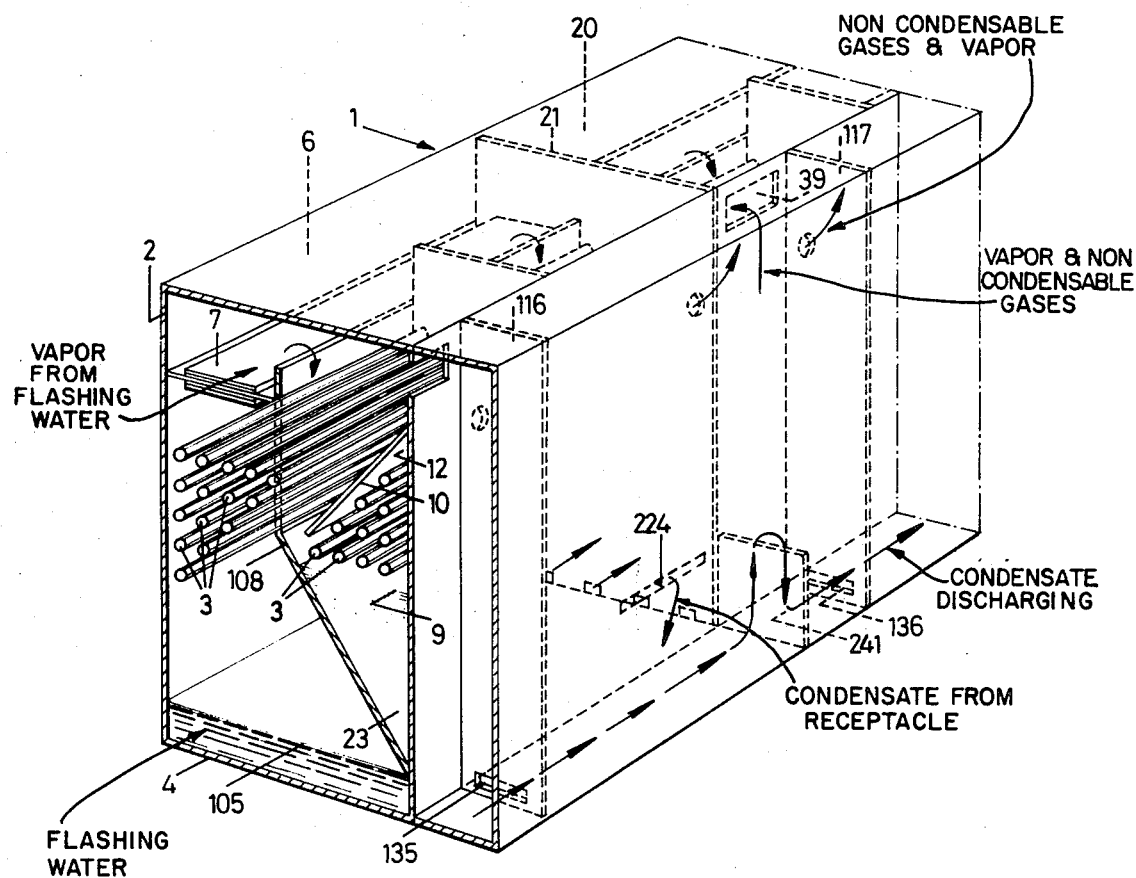

3,713,989
FLASH EVAPORATOR
Pieter Robert Bom, Willem de Zwijgerlaan 37,
Santpoort, Netherlands
Filed Mar. 5, 1970, Ser. No. 16,657
Int. Cl. B01d 3/02
U.S. Cl. 202—173                      13 Claims

ABSTRACT OF THE DISCLOSURE

A flash evaporator has a plurality of chambers connected in series and in parallel, which among other things, makes it possible to put one chamber out of operation for maintenance and repairs without interrupting the process.

---

This invention relates to a flash evaporator comprising an elongated vessel divided by partitions into a plurality of series-connected chambers, in which raw water, to be partly evaporated, successively flows through said chambers at successively lower sub-atmospheric pressure, and the resulting vapour is condensed and falls into a receptacle provided in each chamber, said receptacles having connecting means for the passage of the condensate, a hood, having its opening directed downwardly, being disposed over each receptacle to form a collecting space for any non-condensable gases which may be present in the vapour, each collecting space being in communication with the next chamber, in the downstream direction of the condensate, for the passage of non-condensable gases.

Such a flash evaporator is known from U.S. Pat. 3,213,000, which, however, has the drawback that, if a chamber does not not operate properly, it cannot be put out of operation separately without the entire plant becoming inoperative.

A further drawback is that the condensate which flows into a receptacle from the receptacle of a preceding chamber produces upwardly flowing vapour in the receptacle first-mentioned, which collides with the down-coming vapour from the raw water flowing into the next chamber, which impedes the condensation process and promotes corrosion, because it endangers the unidirectional flow of the vapour, which is required for a good condensation process, as a result of which stagnant zones may be formed, in which zones non-condensable gases are accumulated, which impede the condensation of water vapour, on the one hand, and owing to their composition promote corrosion, on the other.

It is an object of the present invention to avoid these drawbacks, for which purpose a flash evaporator according to the invention is so constructed that the connecting means of the condensate receptacles form a parallel connection of the latter, while in each chamber the condensate receptacle is in communication with the raw-water space by means of a closable by-pass line.

If, in an evaporator constructed in this way, one chamber must be put out of operation, the connection of the condensate receptacle of the chamber concerned is closed, and the closable by-pass line of said condensate receptacle with the raw-water space of the chamber concerned is opened. Owing to the presence of the parallel connection of the condensate receptacles according to the invention the throughflow process of the condensate, except for the condensate from the inoperative chamber, can continue. There can thus be obtained a considerable gain in working hours, and the purity of the final product to be recevored is maintained. The second drawback of the prior flash evaporator, referred to above, is avoided, according to the invention, by virtue of the fact that the vapour from the condensate which has left a given receptacle flows into the condensation space of the next chamber in the same direction as the vapour produced by the raw water in said next chamber.

The invention further aims at providing a cheaper construction.

In a preferred embodiment of the invention, the parallel connection of the condensate receptacles also constitutes the connecting means for the passage of the non-condensable gases.

In illustration of the invention, a number of embodiments will be described, by way of example, with reference to the accompanying diagrammatic perspective drawings.

In said drawings,

FIG. 1 shows a first embodiment of the invention;
FIG. 2 shows a second embodiment of the invention;
FIG. 3 shows a third embodiment of the invention; and
FIG. 4 shows a fourth embodiment of the invention.

Referring to FIG. 1, there is shown a part 1, consisting of two chambers 6, 20, of an elongated vessel 2 which in actual fact consists of a considerably larger number of chambers. The main vessel 2 comprises the supply pipe groups, which in known manner supply the raw water to be subjected to evaporation, generally salt water, to the evaporator, thereby also functioning as condensation surface. Also in known manner, the stream of salt water passes a heater (not shown), in which the raw water is further heated, whereafter it is passed over the bottom 4 of the main vessel 2, in which a layer of crude water 5 is formed. Owing to the fact that a subatmospheric pressure is maintained in the chamber 6 (by means not shown) a great amount of vapour is generated, which vapour rises, flows through a demister 7, and falls as condensate 9 into the receptacle 8, passing the pipe groups 3, as a result of which the vapour is condensed. Since the vapour also entrains non-condensable gases, either from the salt water or from leakage, these will rise from the space, guided by a hood 10 which with the sidewalls 11 of the main vessel 2 defines a collecting space 12 for the non-condensable gases. According to the invention, a duct 13 is formed contiguously with the main vessel 2 in the longitudinal direction of the latter, which duct connects with the main vessel 2 in a particular way characteristic of the present invention. The bottom 14 of the duct 13 is higher than the lowest point of receptacle 8, but lower than the highest point of collecting space 12. The duct 13 is divided by partitions 16, 17 into compartments 18, 19 of approximately equal length to that of chambers 6, 20, formed by partitions 21, 22, but viewed in the longitudinal direction, the compartments 18, 19 are moderately off-set longitudinally relatively to the chambers.

From a low point of the condensate receptacle 8, 23, a pipe 24, 25 with a valve 26, 27 leads to the ducts 13, in which it terminates in its bottom at 28, 29. Short-circuit pipes 30, 31, with valves 32, 33 extends from a point of the condensate space, located at about the same height, to the raw-water space containing the liquid layer 5, 34. Depending U-shaped by-passes 35, 36, 37 provide a series-connection between the compartments 18, 19.

The operation of the flash evaporator according to FIG. 1 is as follows. The condensate 9 is passed through pipe 24 to duct 13, whence the collected condensate flows through by-pass 36 to the next compartment 19. The non-condensable gases enter through holes 37, 38 into duct 13 and flow through an aperture 39 into the next adjacent chamber 20, in which they are entrained by the down-coming condensing vapour of chamber 20 in the same direction and in a similar cycle, namely, via holes 40, 41 and aperture 42, etc. During this process, the valves 32, 33 are closed. If, however, at a given moment, a chamber, e.g. chamber 6, begins to produce impure condensate, valve 26 is closed and valve 32 opened. The condensate from chamber 6 now flows directly back to the raw water 5, so that chamber 6 is disconnected from the production process, but the flow of condensate from the chamber (not shown) preceding chamber 6 passes through by-pass 35 and compartment 18 into compartment 19, while the non-condensable gases can also continue their cycle.

As the condensate flows from the openings 28, 29, evaporation occurs, since the pressure in compartment 18, 19 is lower than that in chamber 6, 20. These vapours escape through aperture 39, 42 to the next chamber 20, 43, in which they are entrained without colliding with the vapours from this chamber.

FIG. 2 shows an alternative embodiment of a plant according to the invention. An opening 124 connects the condensate receptacle 108 with a space 120 separated from the interior of duct 113, which duct at this point is as high as the main vessel 2. A duct 125 connects space 120 with the interior of duct 113. Control valve 126 controls the rate of flow of condensate through duct 125. In this instance, there is no connection like line 31 with valve 33 as in FIG. 1. In the embodiment of FIG. 2, the function of line 31 is performed by a U-shaped tube 131, which is also an overflow tube. When the evaporator has been in operation for some time, a water seal 139 will be formed in the U-shaped tube, by which the condensate receptacle and the crude water space will be separated from each other. When a chamber must be put out of operation, as far as the condensate is concerned, the valve 126 is fully closed. The level of condensate in condensate receptacle 108 will then rise until U-tube 131 will start functioning as an overflow tube. Excess condensate then falls back into the raw water 105.

In the embodiment of FIG. 2, partitions 116, 117 together with openings 135, 136 perform the function which in the construction of FIG. 1 is performed by partitions 16, 17 together with the U-tubes 35, 36.

Even if it is decided to abandon the advantage that a chamber can be closed individually while the process continues, which for example is possible in stationary evaporation processes, the construction according to the invention has advantages over prior constructions, in particular the parallel ducts 13, 113 and lower cost of manufacture. Such a construction is shown in FIG. 3, and a variant in FIG. 4. In these two embodiments, U-tube 131 and line 125 are absent. Instead, one of the partitions 140 and 141 is provided with an opening of reduced cross-section acting as a throttle opening 142, adapted to the process concerned. In FIG. 4, the throttle opening is constituted by opening 224, which passes condensate from the condensate receptacle to duct 113. Adjacent the throttle opening is a partition 241 for maintaining the level of condensate, which level should be above throttle opening 224.

I claim:

1. In a flash evaporaor comprising an elongated vessel divided by partitions into a plurality of series-connected chambers, in which cold raw water, to be preheated is conveyed in cooling pipes, successively through the vapor condensing portions of said chambers and then flashed in reversed flow thru said chambers, and the resulting vapours are condensed and fall into a receptacle provided in each chamber, an exterior conduit longitudinally divided into compartments by transverse partitions, said receptacles having connecting means for the passage of the condensate to said conduit, a hood in each chamber having its opening disposed over each receptacle to form a collecting space for any non-condensable gases which may be present in the vapour, each gas collecting space being in communication with the next gas collecting space via orifices leading into the conduit, in the downstream direction of the condensate flow, for the passage of non-condensable gases, the improvement which is characterized in that the said connecting means of the condensate receptacles form closed channels to the conduit, the channels being in parallel with each other, and passageways connecting the successive compartments to permit condensate flow therebetween, whereby a single channel can be closed without interrupting the flow of condensate in series through the conduit.

2. A flash evaporator according to claim 1, wherein the condensate receptacle in each chamber is in communication with the flashing-water space by means of a closable by-pass line.

3. A flash evaporator according to claim 2, wherein the parallel connection of the condensate receptacles constitutes the connecting means for the passage of the non-condensable gases.

4. A flash evaporator according to claim 2, wherein the conduit is a duct disposed along, and parallel to, a long sidewall of said elongated vessel, wherein said orifices provide a first connection with an elevated point of each of said collecting spaces for passing non-condensable gases from said vapor condensing portion to said duct, and wherein said closed channels provide a second connection to a low point of each condensate receptacle for passing condensate to said duct, said second connection comprising control means for controlling the rate of flow of condensate flowing to said duct, and control means for controlling the level of condensate in said duct, said duct being divided by means of partitions into compartments of a length approximately equal to that of the chambers, each compartment being connected adjacent its end, viewed in the direction of flow of the condensate, with the beginning, also viewed in the direction of flow of the condensate, of the next chamber, each pair of adjacent compartments communicating with each other via points adjacent the bottom and adjacent the partition on opposite sides thereof.

5. A flash evaporator according to claim 2, wherein the closable by-pass line is provided by said condensate receptacle being connected with the flashing water space by a vertical U-shaped pipe (131), whose mouth in the condensate receptacle is adjusted at the height of the desired maximum level of condensate.

6. A flash evaporator according to claim 5, wherein the elongated vessel and the duct have a common sidewall.

7. A flash evaporator according to claim 1, wherein the conduit is a duct disposed along, and parallel to, a long sidewall of said elongated vessel, wherein said orifices provide a first connection with an elevated point of each of said collecting spaces for passing non-condensable gases from said vapor condensing portion to said duct, and wherein said closed channel provides a second connection to a low point of each condensate receptacle for passing condensate to said duct, said second connection comprising control means for controlling the rate of flow of condensate flowing to said duct, and control means for controlling the level of condensate in said duct, said duct being divided by means of partitions into compartments of a length approximately equal to that of the chambers, each compartment being connected adjacent its end, viewed in the direction of flow of the condensate, with the beginning, also viewed in the direction of flow of the condensate, of the next chamber, each pair of adjacent compartments communicating with each other via points adjacent the bottom and adjacent the partition on opposite sides thereof.

8. A flash evaporator according to claim 7 wherein the control means of said second connection is a pocket (120) in contiguous communication with said second connection and partitioned off from said duct, said pocket being connected with the interior of said duct (113) via a conduit having a control valve.

9. A flash evaporator according to claim 7 in which the control means is a pocket (120) in contiguous communication with said second connection and partitioned off from said duct, said pocket (120) communicating with the interior of said duct via an opening (142) of restricted cross-section acting as a throttle opening.

10. A flash evaporator according to claim 7, wherein the elongated vessel and the duct have a common sidewall.

11. A flash evaporator according to claim 1, wherein the conduit is a duct disposed in the vicinity of, and parallel to, a long sidewall of said elongated vessel, the bottom of said duct being at a level intermediate the lowest point of the condensate receptacles and the highest point of the collecting spaces for non-condensable gases, there being provided at least one passage from each of said collecting spaces for non-condensable gases to said duct, and a closable pipe, located outside the cross-sectional contour of the elongated vessel and said duct, extending from a low point of each condensate receptacle to the bottom of said duct, said duct being divided by means of partitions into compartments of a length approximately equal to that of the chambers, each compartment being connected adjacent its end, viewed in the direction of flow of the condensate, with the beginning, also viewed in the direction of flow of the condensate, of the next chamber, each pair of adjacent compartments communicating with each other via points adjacent to the bottom and adjacent to the partition on opposite sides thereof.

12. A flash evaporator according to claim 11, wherein the connected points of two adjacent compartments adjacent the bottom and adjacent each partition on opposite sides thereof communicate with each other through a depending, U-shaped pipe.

13. A flash evaporator according to claim 11, wherein the compartments are longitudinally off-set somewhat relative to the chambers, the connection between each compartment and the next chamber being an aperture in the common sidewall of the elongated vessel and the duct.

References Cited

UNITED STATES PATENTS

| | | | |
|---|---|---|---|
| 3,186,924 | 6/1965 | Williamson | 203—11 X |
| 3,213,000 | 10/1965 | Ewing | 202—173 |
| 3,216,910 | 11/1965 | Langer et al. | 202—173 |
| 3,322,648 | 5/1967 | Kays et al. | 202—174 |
| 3,431,179 | 3/1969 | Starmer | 202—173 |
| 3,461,460 | 8/1969 | McGrath | 202—173 |
| 3,533,917 | 10/1970 | Williams | 202—173 |

FOREIGN PATENTS 943,532   12/1963   Great Britain.

NORMAN YUDKOFF, Primary Examiner

J. SOFER, Assistant Examiner

U.S. Cl. X.R.

159—2 MS